Aug. 29, 1950     C. W. WHITING     2,520,868
GRINDING MACHINE AND LIKE MACHINE TOOL
Filed Aug. 24, 1948     2 Sheets-Sheet 1
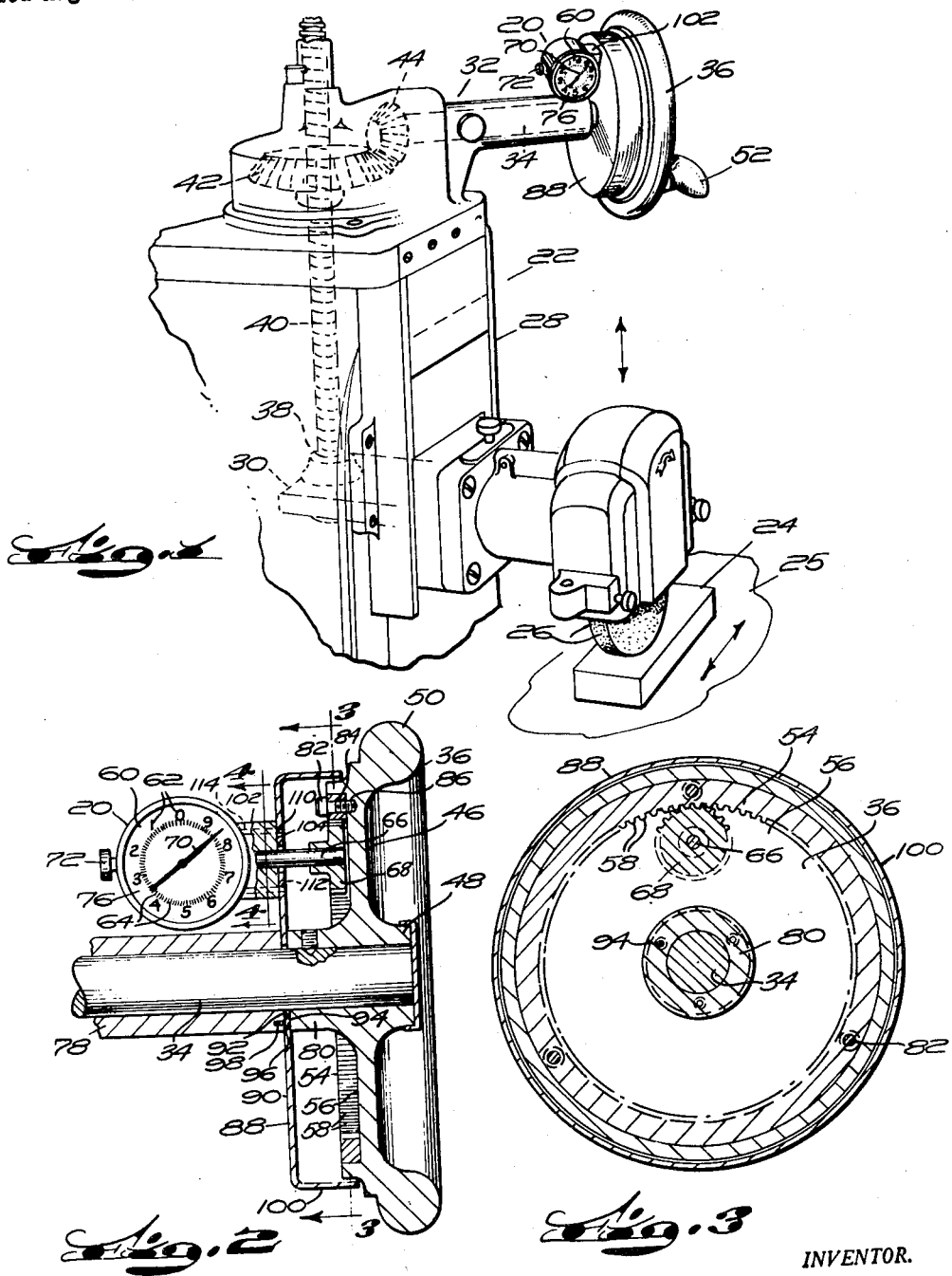
INVENTOR.
Cecil W. Whiting
BY
Thomas A. Jenches
Attorney

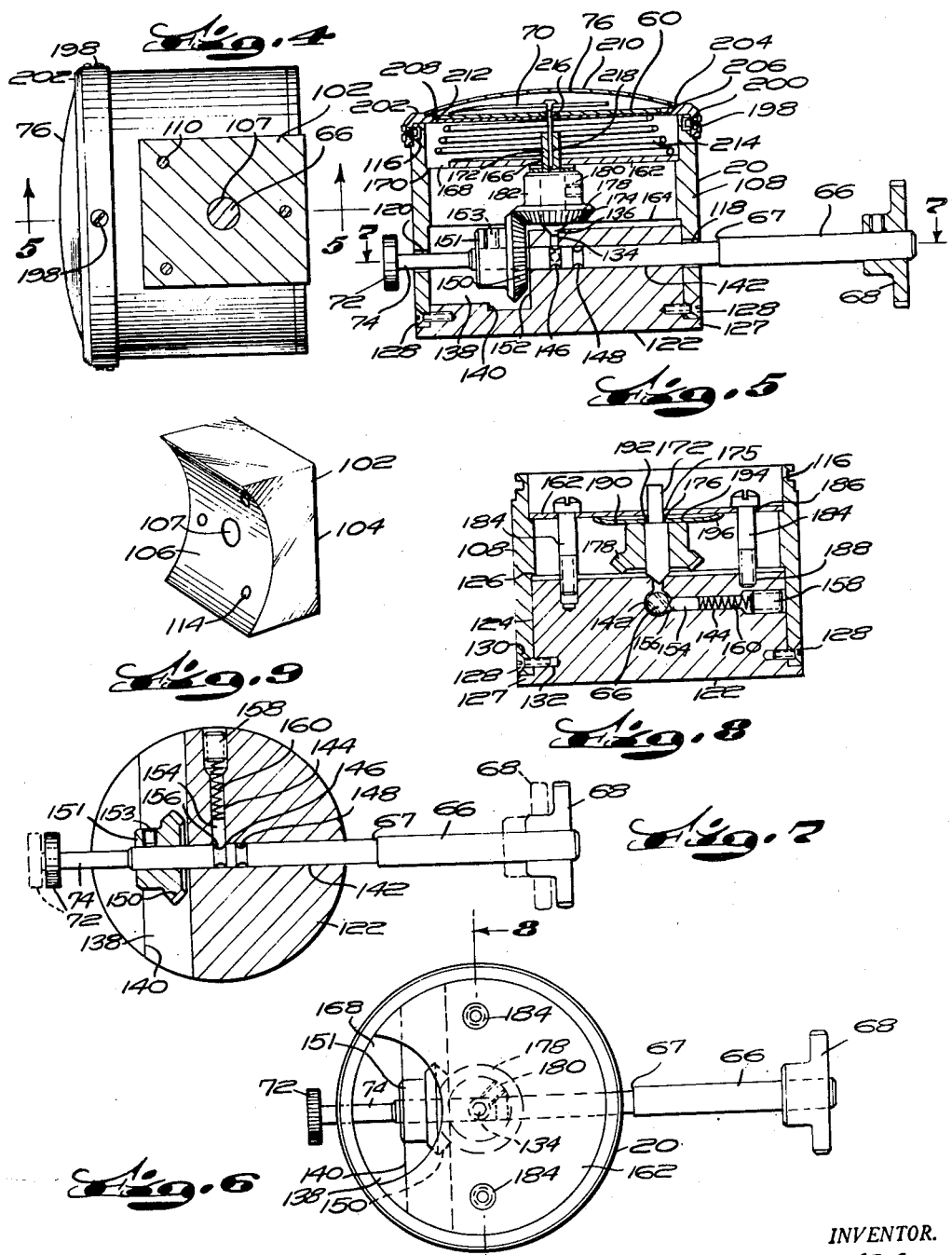

Patented Aug. 29, 1950

2,520,868

UNITED STATES PATENT OFFICE 2,520,868

GRINDING MACHINE AND LIKE MACHINE TOOLS

Cecil Walter Whiting, Providence, R. I.

Application August 24, 1948, Serial No. 45,852

15 Claims. (Cl. 51—92)

My invention relates to improvements in grinding machines and like machine tools, such as milling machines, lathes, drills, boring mills, shapers, etc.

So far as I am aware, no counters or measuring devices at present on the market actually measure less than .0005". For a large amount of precision work, this is not sufficiently accurate, so that the piece of work has to be taken from the table and measured by calipers, micrometers or other measuring devices. This problem has been particularly acute in surface grinding as the size of the piece of metal being ground has often times been so large that it is difficult to remove it and measure it.

An object of my invention, therefore, is to provide a machine tool having means mounted thereon which will measure the amount of material removed in .0001", which is sufficiently accurate for most precision purposes, so as to dispense with any necessity of removing the work therefrom, and individually measuring it by calipers, micrometers or other measuring tools after each cut, oftentimes a slow and tedious operation and one apt to gather dust underneath the piece and on the table which lifts the work so it measures thicker than it is and so is often ground more than the desired amount and hence is undersize. My invention, therefore, which makes it possible to grind or remove the desired amount from the work without removing the work itself from the table, thus also prevents any such undersize grinding.

A further object of my invention is to provide a movable dial or other means which may be set to signify the amount desired to be removed from the work so that the counter as it rotates will indicate on the dial the exact point to stop the grinding or work removing operation.

While I am aware that others have provided rotatable dials in counters having a member projecting therefrom contacted by the work, so far as I am aware no one has hitherto provided a settable movable dial in which the counter is actually rotated from an outside source such as a hand wheel rotated by the operator to keep the grinding wheel or other tool continuously in contact with the work as the material is being removed from the work. Such a combination is particularly desirable when making a series of cuts such as steps on the same piece of work, as the dial can be imediately reset after each cut or step is formed.

A further object of my invention is to provide a counter whose dial is readily visible at all times.

To regulate the distance between the tool and the work, most types of machine tools on the market have a column and adjustable means mounted on the column for varying such distance. In general, my invention may be employed on any of such machine tools, but as shown in the drawings, it is particularly adapted for use on a surface grinder.

Further objects of my invention relate to the specific construction of the counter itself, including the means I employ for mounting the counter on the machine to be actuated by the usual hand wheel employed in the adjusting means just mentioned, the rotatable dial hitherto described, the fact that I provide a device wherein the operating gears may be disengaged when not in use and various other specific features of construction of the counter itself.

A further object of my invention is to provide a device which may be used as an attachment for existing machines or one which may be actually built into machine tools when initially built.

These and such other objects of my invention as may hereinafter appear will be best understood from a description of an embodiment thereof such as is shown in the accompanying drawings.

In the drawings,

Fig. 1 is a fragmentary perspective view of the column, work and grinding wheel of a surface grinding machine having my invention attached.

Fig. 2 is a longitudinal sectional view taken through the wheel adjacent the end of the operating shaft of the device shown in Fig. 1.

Fig. 3 is a vertical sectional view taken through the supplemental gear attached to the hand wheel and the pinion I provide to mesh therewith on the end of the counter operating shaft along the line 3—3 of Fig. 2.

Fig. 4 is a vertical sectional view through the supporting block looking inwardly towards the counter, taken along the line 4—4 of Fig. 2.

Fig. 5 is a longitudinal sectional view through the counter along the line 5—5 of Fig. 4, showing the operating shaft in elevation.

Fig. 6 is a plan view of my improved counter and operating shaft with the dial, pointer and dial supporting coil spring removed.

Fig. 7 is a transverse horizontal sectional view through the counter base showing the operating shaft in elevation taken along the line 7—7 of Fig. 5.

Fig. 8 is a vertical sectional view taken transversely of the center of the counter along the line 8—8 of Fig. 6.

Fig. 9 is a perspective view of the supporting block I preferably employ.

In the drawings, wherein like characters of reference generally indicate like parts throughout, 20 generally indicates a counter and its operating parts constructed in accordance with my invention, adapted to be mounted on a machine tool 22 for removing stock from work 24.

While I have shown my invention applied to a surface grinder, it is obvious that it may be applied to any analogous type of machine tool such as milling machine, a lathe, a drill, a boring mill, a shaper, etc., having a work table 25, a stock removing tool such as the grinding wheel 26, movable relative to said work table or work 24, a column 28 for relative movement of said work 24 and tool 26, means 30 adjustable on said column for positioning said tool 26 relative to said work 24 and means 32 for actuating said adjusting means including the rotatable shaft 34 projecting from said column and a hand wheel 36 on the end of said shaft 34.

In the surface grinder shown, the work 24 is mounted on the reciprocating work table 25 and the column 28 projects upwardly in rear of the work table. The grinding wheel 26 is mounted on a suitable spindle (not shown), which in turn is supported by the plate 30 which slides up and down in the column on suitable guideways (not shown).

The plate 30 has the threaded hole 38 therein through which the threaded shaft 40 projects, thus permitting the plate 30 supporting the grinding wheel 26, to be raised and lowered respectively on respective rotation of said shaft 40. The shaft 40 is driven by a suitable ring bevel gear 42 driven by the bevel pinion 44 on the inner end of the drive shaft 34 on the outer end of which the hand wheel 36 is mounted.

As stated, my invention may be employed as an attachment for existing hand wheels 36 or other controls, but I have shown in the drawings a novel type of hand wheel having a continuous web or annular hollowed out portion 46 joining the hub 48 thereof to the roll or solid cylindrical rim 50 thereof. With this construction, the thumb may be inserted underneath the rim 50 and the fingers inserted in the end of the depression 46 so that the same may be readily turned independently of the handle 52.

Such a shaft 34 and a hand wheel 36 of standard spoke type are common on present day types of surface grinding machines and a pointer may be mounted on the shaft support to register against indicia on the hand wheel. Due, however, to the construction, it is impossible to provide more indicia than for .001" which may be separated by one supplemental intermediate mark to read in terms of .0005" which, as stated, has not been sufficient for many precision jobs and makes it necessary to remove the work and supplementally measure it either by calipers, micrometers or other measuring instruments after each respective cut. In such surface grinding machines, due to the reduction bevel gears 42 and 44, one revolution of the hand wheel moves the grinding wheel .050", although it is obvious that other ratios of gears may be employed to give different relative movements to the work or tool depending on the nature of the machine tool and its particular manufacturer.

In accordance with my invention, I provide a toothed ring gear 54 of large diameter relative to the back portion 56 of the wheel 36, in the embodiment shown said ring gear 54 being of substantially the diameter of said back portion 56 and internally toothed as at 58 to provide the internal gear 54. I also provide the counter 20 mounted on said column having a dial 60 graduated with suitable indicia, in the embodiment shown for surface grinding machines, being graduated with ten equally spaced numerals 62, said numerals indicating from .001" to .010", each space being subdivided into ten equal parts separated by the marks 64, each of .0001". To actuate the counter 20, I provide an operating shaft 66 which has a pinion gear 68 mounted on the outer end thereof to mesh with the teeth 58 of the internal gear 54, which shaft 66 drives the counter 20 in a manner to be described. In the embodiment shown, the ring or internal gear 54 provides a 5 to 1 reduction to said pinion 68. Said sounter 60 is also provided with a pointer 70 rotated by said operating shaft 66 of said dial 60, whereby said dial 60 may indicate the amount of material removed from the work 24 by said grinding wheel 26 to a .0001".

In the embodiment shown, I provide means such as the knob 72 mounted on a diametric extension 74 of said operating shaft 66 to disengage the pinion gear 68 from the ring gear 54 and also the bevel gears in the counter to be disengaged from each other. This permits the gears to be disengaged for movement normal to the work and as the gears are out of mesh most of the time, prevents wear on the respective gears when my improved counter is not being used.

I also, as stated, provide means such as the rotatable transparent cap 76 for the dial, whereby the dial 60 may be rotated independently of the pointer 70 to a starting position independently of movements of the tool 26, work 24 or other portions of the counter 20 to predetermine the amount of work to be removed.

In my preferred embodiment, my improved counter is preferably constructed as follows. The rotatable shaft 34 may be provided, as usual, with the rigid sleeve bearing 78 projecting from said column. The hand wheel 36 may be provided with the hollow central inwardly projecting hub 80 for mounting on the outer end of the shaft 34. The ring gear 54 is removably mounted on the inner surface 56 of said hand wheel by means of the screws 82 extending through suitable holes 84 in said internal gear 54 and cooperating holes 86 provided therefor in the rear surface 56 of said hand wheel.

While my improved counter 20 may be suitably mounted on said machine in any suitable manner on the sleeve 78 or on any other suitable part thereof, I preferably mount it on the column 28 as follows. I provide a cylindrical guard member 88, having the closed flat circular inner wall 90, having the central opening 92 for the shaft 34 adapted to be rigidly attached to the end of the sleeve bearing 78 in any suitable manner, preferably by means of the screws 94 extending through suitable holes 96 in said wall 90 and axial holes 98 in the end of said sleeve 78. The guard member preferably has an outwardly projecting cylindrical guard wall 100 at the edge thereof projecting outwardly to terminate slightly exterior of said internal gear 54. I provide a block 102 having a flat outer surface 104 securable to the inner surface of the flat wall 90 of said guard member and a cylindrical transversely grooved counter receiving channel 106 in the inner surface thereof and a central operating shaft receiving hole 107.

I also provide the cylindrical counter 20 comprising a hollow cylindrical shell 108 and I preferably provide single means such as the elongated screws 110 extending through suitable holes 112 in said guard member rear wall 90, through suitable holes 114 in said block and into suitable holes in said shell, although any suitable type of means may be provided for securing the counter 20 to the guard member 88 or on the machine.

Said shell 108 has an annular external groove 116 near the front end thereof and an outer shaft hole 118 in the side wall thereof substantially centrally thereof. Where the extension 74 for the shaft 66 is provided, having the turning knob 72, a diametric inner shaft hole 120 in alignment therewith is supplementally provided. Said shaft holes 118 and 120 are substantially normal to the teeth 58 of said internal gear 54.

To close the rear end of said shell 108, I provide the preferably flat cylindrical base 122 extending upwardly within said shell, preferably removably secured within the rear portion of said shell. In the embodiment shown, for this purpose the rear portion of said shell is enlarged as at 124 providing the stop shoulder 126 substantially centrally thereof and the rear end of the base 122 is provided with the outwardly projecting annular lip 127 adapted to contact the rear edge of said shell and attaching screws 128 are provided projecting radially inwardly through suitable countersunk holes 130 in said shell and suitable aligned holes 132 in said base. Said base is also provided with the pointer shaft bearing hole 134 centrally of the front wall thereof having a conical seat 136. Said base 122 is also provided with an open inner portion 138 beyond the centre line thereof extending to adjacent the rear end thereof for a purpose to be described and if desired may be provided with a rear wall of less height at the inner end thereof providing a stop shoulder 140. I also provide an operating shaft hole 142 extending from the outer surface of said open portion to the outer edge of said shell aligned with said diametric shell holes 118 and 120.

As stated, I may, if desired, provide the manipulating knob 72 for moving the shaft 66 from a position with the pinion gear 68 thereof meshing with the internal gear 54 on said hand wheel 36 to a position out of mesh therewith and I may also provide means in association therewith for yieldingly locking said shaft in said two axial positions. For this purpose, I provide a hole 144 extending radially at right angles from said shaft hole 142.

I also provide the operating shaft 66 extending through said diametric shell holes 118 and 120 where employed and said base hole 142 preferably having the reduced inner end extending from a spaced distance outwardly of said shell 108 to provide a stop shoulder 67 and I provide, as stated, if desired, the manipulating knob 72 on its inner end and the pinion gear 68 on its outer end adapted to mesh with said internal gear 54 on said hand wheel 36. The inner shaft portion is provided with two spaced concave annular grooves 146 and 148 therein adjacent the centre of said counter. I also rigidly mount an outwardly facing bevel gear 150 on said shaft immediately adjacent the outer wall 152 of said open base portion 138. For this purpose, I provide a hub 151 projecting inwardly from said gear and a set screw 153 extending through a hole in said hub to abut said shaft 66 to rigidly secure said bevel gear 150 to said shaft. I provide the locking pin 154 contained within said radial base hole 144 having a convex inner end 156 adapted to selectively engage the inner annular shaft groove 146 to retain said pinion gear 68 in mesh with said internal gear 54 or to selectively engage said outer annular shaft groove 148 on outward axial movement of said shaft 66 by said manipulating knob 72 to retain said pinion gear 68 out of mesh with said internal gear 54. I also provide a plug 158 for the outer end of said radial hole 144, which may comprise an adjustable screw and expansion spring means 160 in said hole between said locking pin 154 and plug 158 adapted to yield to permit axial movement of said shaft on pressure exerted on said manipulating knob 72, said adjustable screw functioning to vary the tension exerted by the spring.

The stop shoulder 67 on the operating shaft and the stop shoulder 140 in said base operate simultaneously where employed together, or singly if employed alone, to stop inward movement of the shaft 66 if the pin 154 should slip out of the groove 148 on the inward movement of the shaft 66 to prevent axial movement of the gear 150 on said shaft, thereby insuring continued meshing of all gears at all times.

For a purpose which will be obvious, I provide a disc floor 162 mounted on said shell at a spaced distance from the base front surface 164 having a pointer shaft bearing hole 166 centrally thereof and an open portion 168 at the inner end thereof. For this purpose, the shell may have its front end enlarged to provide a shoulder 170 therein on which said floor 162 may rest.

I provide a pointer shaft 172 having a rear end 174 resting in said base bearing hole 124 extending through said floor hole 166 and having a reduced portion projecting forwardly beyond said shell forming the shoulder 176. I rigidly mount a cooperating downwardly facing pinion gear 178 on said pointer shaft, also preferably by means of a setscrew 180 extending through the hub 182 thereof between said base front surface 164 and said floor 162 adapted to mesh with said operating shaft bevel gear 150 in its outermost position. To retain the floor 162 against the shoulder 170, I provide the bolts 184 projecting downwardly through suitable holes 186 in said floor into suitable holes 188 in said base 122. To urge the lower end 174 of said pivot shaft 172 into its bearing hole 134, I provide a bow spring 190 having a pointer shaft receiving hole 192 of the size of the reduced portion 175 thereof, so that its bow 194 may abut the shoulder 176 thereof. Said bow spring is arranged to extend transversely underneath the floor so that its ends 196 may abut the rear surface of the floor to maintain said pointer shaft 172 in axial alignment.

In place of the bolts 184, any suitable type of means may be provided to secure the floor 162 at a spaced distance from the upper surface 164 of said base, and in place of the floor 164, bow spring 190 and said shoulder 176, any suitable means may be provided to support said pointer shaft in a substantially axial position.

I provide the transparent dial cap 76 for the front end of said shell 108. In my preferred embodiment, said cap 76 is rotatably mounted thereon preferably by means of the set screws 198 projecting inwardly from the cylindrical rearward extension 200 of said cap 76 to within said groove 116 to rotatably retain said cap on said shell, although any other suitable means for this purpose may be employed. Said cap comprises a flat front rim plate 202 adapted to overlie the front edge of the shell, having an annular cover receiving bezel 204 in its front edge and a dial receiving groove 206 in its rear edge, preferably having a notch 208 therein. The rim extension 200 projects cylindrically downwardly from said rim plate 202 and is provided with said set screws 198 or other means to fit into the groove 116 to retain the cap 76 to said shell. In the embodiment shown, I provide the concave lens shaped transparent cover 210 mounted within said internal cap bezel 204.

As stated, I also provide the calibrated dial disc 60 abutting the dial groove 206 of said rotatable cap 76, having the projection 212 fitting into said notch 208 so that said dial 60 will rotate with the cap. To positively push the dial 60 upwardly against said screws 106 so that its projection 212 will fit in said notch 208 and the dial 60 will be frictionally maintained against the rim, I provide the coil spring 214 having its rear end abutting the floor 162 and its front end abutting said dial 60 to retain said dial 60 in said position within said cap groove 206 and permit the rotation of said dial 60 with said cap 76. I also provide the pointer 70 mounted on the front end of said pointer shaft between said transparent cover 210 and disc 60. In the embodiment shown, the pointer is mounted on the pin shaft 216 which is frictionally engageable within the annular hole 218 in the upper end of the reduced portion of said pointer shaft 166.

With this construction, it is obvious that the pointer may be removed with the cap, so that the dial 60 may be removed from said cap 76, if desired, and that the pointer will always be in the right position in use.

It is obvious that with my improved construction, I have provided a counter which may be readily assembled and disassembled. The cap 76 may be first removed by merely undoing the set screws 198, pulling the pointer and its attached pin shaft 216 with it, permitting the dial 60 to be removed therefrom. The coil spring 214 may also be readily removed. If it is merely desired to see if the gears are in proper mesh, the finger may be inserted through the open portion 168 of the floor, but if not, the bolts 184 may be readily removed permitting removal of the floor 162 and the disassembly, if desired, of the bevel gears 174 and 150 from the respective pointer shaft 166 and operating shaft 66. If desired, the knob 72 may be removed and the shaft 66 pulled out of its respective holes.

In use, the hand wheel 36 is turned until the grinding wheel 26 abuts the work 24. At this point, the dial cap may be rotated to the zero mark and then set for the desired amount desired to be removed and the grinding machine started. As the grinding proceeds, the hand wheel is turned so as to maintain the grinding wheel 26 in operative contact with the work 24 and as the metal is ground off, the dial will indicate the amount of metal ground off as evidenced by the turning of the hand wheel. When the desired amount has been ground or cut off, either the machine is stopped or the hand wheel is no longer turned to bring the grinding wheel in further contact with the work and the exact amount of metal removed will be indicated on the dial up to .0001". If my invention is employed in other types of machine tools, it is operated in a similar manner, although often with a different ratio or scale.

It is apparent that I have provided a novel type of machine tool and an attachment for existing types of machine tools with the advantages described above.

It is apparent that my invention is not limited to the specific embodiment shown and that various deviations may be made therefrom without departing from the spirit and scope of the appended claims.

What I claim is:

1. In a surface grinder, in combination, a reciprocal work table, a column in rear of said work table, a grinding wheel rotatable over said work table, means vertically adjustable on said column for supporting said grinding wheel, means for moving said vertically adjustable means, including a rotatable shaft projecting laterally from said column and a hand wheel on the end of said shaft operable on one revolution thereof to move said grinding wheel .050", a ring gear mounted on the inner surface of said hand wheel, a counter mounted on said column having a dial graduated with ten equally spaced numerals, said numerals indicating from .001" to .010", each space being subdivided into ten equal parts each of .0001", an operating shaft, a pinion gear mounted thereon meshing with said ring gear having a 5 to 1 reduction from said ring gear and a pointer rotated thereby movable over said dial, whereby said dial may directly indicate the amount of material removed from the work by said grinding wheel to .0001".

2. In a surface grinder, in combination, a reciprocal work table, a column in rear of said work table, a grinding wheel rotatable over said work table, means vertically adjustable on said column for supporting said grinding wheel, means for moving said vertically adjustable means, including a rotatable shaft projecting laterally from said column and a hand wheel on the end of said shaft, a ring gear mounted on the inner surface of said hand wheel, a counter mounted on said column having a dial, an operating shaft, a pinion gear mounted thereon meshing with said ring gear, and a pointer rotated thereby movable over said dial, whereby said dial may directly indicate the amount of material removed from the work by said grinding wheel.

3. In a machine for removing stock from work, having a work table, a stock removing tool movable relative to said work table, a column for relative movement of said work table and tool, means adjustable on said column for positioning said tool relative to said work, means for actuating said adjustable means, including a rotatable shaft projecting from said column and a hand wheel on the end of said shaft, a ring gear mounted on the inner surface of said hand wheel, a counter mounted on said machine having a dial, an operating shaft having a pinion gear mounted thereon meshing with said ring gear and a pointer rotated thereby movable over said dial, whereby said dial may directly indicate the amount of material removed from the work by said tool.

4. An attachment for a machine for removing stock from work having a hand wheel for adjusting the relative positions of the work and the stock removing tool, comprising a ring gear mountable on the inner surface of said hand wheel, a counter mountable on said machine having a dial, an operating shaft extending between said ring gear and said counter and having a pinion gear mounted thereon to mesh with said ring gear and a pointer rotated thereby movable over said dial, whereby said dial may directly indicate the amount of material removed from the work by said tool, means to axially move said shaft to disengage said pinion gear from said ring gear and means to move said dial to starting position independently of movements of the tool, work or other portions of the counter to predetermine the amount of work to be removed.

5. An attachment for a machine for removing stock from work having a hand wheel for adjusting the relative positions of the work and the stock removing tool, comprising a ring gear removably mountable on the inner surface of said hand wheel, a cylindrical guard member having a closed flat inner wall having a central opening for the hand wheel shaft adapted to be rigidly attached to the end of the hand wheel shaft bearing, having an outwardly projecting cylindrical guard wall at the edge thereof terminating exterior of said ring gear, a block having a flat outer surface securable to the inner surface of said guard member, a cylindrically transversely grooved counter receiving channel in the inner surface thereof and a central shaft receiving hole and a cylindrical counter comprising a hollow cylindrical shell, single means extending through said block to join said block to said guard and to said counter shell, said shell having an annular external groove near the front end thereof and diametric inner and outer shaft holes in the side wall thereof substantially centrally thereof, a solid cylindrical base extending upwardly a distance within said shell, removably secured within the rear portion of said shell, having a pointer shaft bearing hole centrally of the front wall thereof and having an open inner portion beyond the center line thereof extending to adjacent the rear end thereof, having a rear wall of less height on the inner end thereof providing a stop shoulder, an operating shaft hole extending from the outer surface of said open portion to the outer edge of said shell aligned with said diametric shell holes, a hole extending radially at right angles from said shaft hole, an operating shaft extending through said diametric shell and base holes, having a reduced inner end extending from a spaced distance outwardly of said shell to provide a stop shoulder, said shaft having a manipulating knob on its inner end and a pinion gear on its outer end adapted to mesh with said ring gear on said hand wheel, said reduced shaft portion having two spaced annular concave grooves therein adjacent the center of said counter and an outwardly facing bevel gear mounted on said reduced portion immediately adjacent the outer wall of said open portion, a locking pin contained within said radial base hole having a convex inner end adapted to selectively engage the inner annular shaft groove to retain said pinion gear in mesh with said ring gear and said outer annular shaft groove on axial movement of said shaft by said manipulating knob to retain said pinion gear out of mesh with said ring gear, a plug for the outer end of said radial hole and expansion spring means in said hole located between said locking pin and plug adapted to yield for axial movement of said shaft, a disc floor mounted on said shell at a spaced distance from said base front surface having a pointer shaft bearing hole centrally thereof and an open portion at the inner end thereof, a pointer shaft having a rear end resting in said base bearing hole extending forwardly through said floor hole and having a reduced portion projecting forwardly beyond said shell and forming a shoulder, a cooperating downwardly facing bevel gear rigidly mounted on said pointer shaft between said base front surface and floor adated to mesh with said operating shaft bevel gear in its outermost position, a bow spring having a pointer shaft receiving hole centrally of the rearwardly extending bow thereof with its flow abutting the shoulder on the pointer shaft and its ends abutting the rear surface of said floor, means to rigidly secure said base front floor at a spaced distance from said base front surface, a transparent rotatable dial cap for the front end of said shell comprising a flat front rim plate adapted to overlie the front edge of said shell, having an annular cover receiving bezel in its front edge and a dial receiving groove in its rear edge having a notch therein and having a rearwardly extending cylindrical rim having means extending radially within said shell groove to rotatably retain said cap on said shell, a concave lens shape transparent cover mounted within said internal cap bezel, a calibrated dial disc abutting the dial groove of said rotatable cap having a projection fitting into said notch so that said dial will rotate with the cap, a coil spring having its rear end abutting said floor and its front end abutting said dial to retain said dial in position within said cap groove and permit rotation thereof therewith, and a pointer mounted on the front end of said pointer shaft between said transparent cover and the dial.

6. An attachment for a machine for removing stock from work having a hand wheel for adjusting the relative positions of the work and the stock removing tool, comprising a ring gear removably mountable on the inner surface of said hand wheel, a counter mounted on said machine and comprising a hollow shell having diametric inner and outer shaft holes in the side wall thereof substantially centrally thereof, means to rigidly mount said counter on said machine with said diametric shaft holes substantially normal to the teeth of said ring gear, a solid base extending upwardly a distance within said shell, having a pointer shaft bearing hole centrally of the front wall thereof, an open inner portion beyond the center line thereof extending to adjacent the rear end thereof, an operating shaft hole extending from the outer surface of said open portion to the outer edge of said shell aligned with said diametric shell holes, an operating shaft extending through said diametric shell and base holes having a manipulating knob on its inner end and a pinion gear on its outer end adapted to mesh with said ring gear on said hand wheel, said shaft having an outwardly facing bevel gear mounted thereon immediately adjacent the outer wall of said open portion, a pointer shaft having a rear end resting in said base bearing hole extending forwardly, a cooperating downwardly facing bevel gear rigidly mounted on said pointer shaft adapted to mesh with said operating shaft bevel gear in its outermost position, means supporting said pointer shaft in a substantially axial position, a transparent dial cap for the front end of said shell, a calibrated dial mounted on said shell and a pointer mounted on the front end of said pointer shaft between said transparent cover and the dial.

7. An attachment for a machine for removing stock from work having a hand wheel for adjusting the relative positions of the work and the stock removing tool, comprising a ring gear removably mountable on the inner surface of said hand wheel, a counter mounted on said machine and comprising a hollow shell having an outer shaft hole in the side wall thereof, means to rigidly mount said counter on said machine with said shaft hole substantially normal to the teeth of said ring gear, a solid base extending upwardly a distance within said shell, having a pointer shaft bearing hole centrally of the front wall thereof, an open inner portion beyond the center line thereof extending to adjacent the rear end thereof, an operating shaft hole extending from the outer surface of said open portion to the outer edge of said shell aligned with said shell hole, an operating shaft extending through said shell and base holes having a pinion gear on its outer end adapted to mesh with said ring gear on said hand wheel, said shaft having an outwardly facing bevel gear mounted thereon immediately adjacent the outer wall of said open portion, a pointer shaft having a rear end resting in said base bearing hole extending forwardly, a cooperating downwardly facing bevel gear rigidly mounted on said pointer shaft adapted to mesh with said operating shaft bevel gear, means supporting said pointer shaft in a substantially axial position, a transparent dial cap for the front end of said shell, a calibrated dial mounted on said shell and a pointer mounted on the front end of said pointer shaft between said transparent cover and the dial.

8. An attachment for a machine for removing stock from work having a hand wheel for adjusting the relative positions of the work and the stock removing tool, comprising a ring gear removably mountable on the inner surface of said hand wheel, a counter mounted on said machine and comprising a hollow shell having an outer shaft hole in the side wall thereof, means to rigidly mount said counter on said machine with said shaft hole substantially normal to the teeth of said ring gear, a solid base extending upwardly a distance within said shell, having a pointer shaft bearing hole centrally of the front wall thereof, an open inner portion beyond the center line thereof extending to adjacent the rear end thereof, an operating shaft hole extending from the outer surface of said open portion to the outer edge of said shell aligned with said shell hole, an axially movable operating shaft extending through said shell and base holes having a pinion gear on its outer end adapted to mesh with said ring gear on said hand wheel, said shaft having an outwardly facing bevel gear mounted thereon immediately adjacent the outer wall of said open portion, a pointer shaft having a rear end resting in said base bearing hole extending forwardly, a cooperating downwardly facing bevel gear rigidly mounted on said pointer shaft adapted to mesh with said operating shaft bevel gear, means supporting said pointer shaft in a substantially axial position, a transparent dial cap for the front end of said shell, a calibrated dial mounted on said shell and a pointer mounted on the front end of said pointer shaft between said transparent cover and the dial, and means to hold said operating shaft in respective positions with its pinion gear in and out of mesh with said ring gear.

9. An attachment for a machine for removing stock from work having a hand wheel for adjusting the relative positions of the work and the stock removing tool, comprising a ring gear removably mountable on the inner surface of said hand wheel, a counter mounted on said machine and comprising a hollow shell having an outer shaft hole in the side wall thereof, means to rigidly mount said counter on said machine with said shaft hole substantially normal to the teeth of said ring gear, a solid base extending upwardly a distance within said shell, having a pointer shaft bearing hole centrally of the front wall thereof, an open inner portion beyond the center line thereof extending to adjacent the rear end thereof, an operating shaft hole extending from the outer surface of said open portion to the outer edge of said shell aligned with said shell hole, an operating shaft extending through said shell and base holes having a pinion gear on its outer end adapted to mesh with said ring gear on said hand wheel, said shaft having an outwardly facing bevel gear mounted thereon immediately adjacent the outer wall of said open portion, a pointer shaft having a rear end resting in said base bearing hole extending forwardly, a cooperating downwardly facing bevel gear rigidly mounted on said pointer shaft adapted to mesh with said operating shaft bevel gear, means supporting said pointer shaft in a substantially axial position, a transparent dial cap for the front end of the shell having a calibrated dial secured thereto to rotate therewith rotatably mounted on the front end of said shell, and a pointer mounted on the front end of said pointer shaft between said transparent cover and the dial.

10. An attachment for a machine for removing stock from work having a hand wheel for adjusting the relative positions of the work and the stock removing tool, comprising a ring gear removably mountable on the inner surface of said hand wheel, a cylindrical guard member having a closed flat inner wall having a central opening for the hand wheel shaft adapted to be rigidly attached to the end of the hand wheel shaft bearing, having an outwardly projecting cylindrical guard wall at the edge thereof terminating exterior of said ring gear, a block having a flat outer surface securable to the inner surface of said guard member and a transversely grooved counter receiving channel in the inner surface thereof, a counter comprising a hollow shell, single means extending through said block to join said block to said guard and to said counter shell, said shell having an outer shaft hole in the side wall thereof, means to rigidly mount said counter on said machine with said shaft hole substantially normal to the teeth of said ring gear, a solid base extending upwardly a distance within said shell, having a pointer shaft bearing hole centrally of the front wall thereof, an open inner portion beyond the center line thereof extending to adjacent the rear end thereof, an operating shaft hole extending from the outer surface of said open portion to the outer edge of said shell aligned with said shell hole, an operating shaft extending through said shell and base holes having a pinion gear on its outer end adapted to mesh with said ring gear on said hand wheel, said shaft having an outwardly facing bevel gear mounted thereon immediately adjacent the outer wall of said open portion, a pointer shaft having a rear end resting in said base bearing hole extending forwardly, a cooperating downwardly facing bevel gear rigidly mounted on said pointer shaft adapted to mesh with said operating shaft bevel gear, means supporting said pointer shaft in a substantially axial position, a transparent dial cap for the front end of said shell, a calibrated dial mounted on said shell and a pointer mounted on the front end of said pointer shaft between said transparent cover and said dial.

11. An attachment for a machine for removing stock from work having a hand wheel for adjusting the relative positions of the work and the stock removing tool, comprising a ring gear removably mountable on the inner surface of said hand wheel, and a cylindrical counter mounted on said machine and comprising a hollow cylindrical shell having diametric inner and outer shaft holes in the side wall thereof, means to rigidly mount said counter on said machine with said shaft holes substantially normal to the teeth of said ring gear, a solid base extending upwardly a distance within said shell, removably secured within the rear portion of said shell, having a pointer shaft bearing hole centrally of the front wall thereof, an open inner portion beyond the center line thereof extending to adjacent the rear end thereof having a rear wall of less height on the inner end thereof providing a stop shoulder, an operating shaft hole extending from the outer surface of said open portion to the outer edge of said shell aligned with said diametric shell holes, a hole extending radially at right angles from said shaft hole, an operating shaft extending through said diametric shell and base holes having a reduced inner end extending from a spaced distance outwardly of said shell, said shaft having a manipulating knob on its inner end and a pinion gear on its outer end adapted to mesh with said ring gear on said hand wheel, said reduced shaft portion having two spaced annular concave grooves therein adjacent the center of said counter and an outwardly facing bevel gear mounted on said reduced portion immediately adjacent the outer wall of said open portion, a locking pin contained within said radial base hole having a convex inner end adapted to selectively engage the inner annular shaft groove to retain said pinion gear in mesh with said ring gear and said outer annular shaft groove on axial movement of said shaft by said manipulating knob to retain said pinion gear out of mesh with said ring gear, a plug for the outer end of said radial hole and expansion spring means in said hole located between said locking pin and plug adapted to yield for axial movement of said shaft, a pointer shaft having a rear end resting in said base bearing hole extending forwardly, a cooperating downwardly facing bevel gear rigidly mounted on said pointer shaft adapted to mesh with said operating shaft bevel gear in its outermost position, means supporting said pointer shaft in a substantially axial position, a transparent dial cap for the front end of said shell, a calibrated dial mounted on said shell and a pointer mounted on the front end of said pointer shaft between said transparent cover and the dial.

12. An attachment for a machine for removing stock from work having a hand wheel for adjusting the relative positions of the work and the stock removing tool, comprising a ring gear removably mountable on the inner surface of said hand wheel, a counter mounted on said machine and comprising a hollow shell having diametric inner and outer shaft holes in the side wall thereof, means to rigidly mount said counter on said machine with said diametric shaft holes substantially normal to the teeth of said ring gear, a solid base extending upwardly a distance within said shell, having a pointer shaft bearing hole centrally of the front wall thereof, an open inner portion beyond the center line thereof extending to adjacent the rear end thereof, an operating shaft hole extending from the outer surface of said open portion to the outer edge of said shell aligned with said diametric shell hole, a hole extending radially at right angles from said shaft hole, an operating shaft extending through said diametric shell and base holes having a manipulating knob on its inner end and a pinion gear on its outer end adapted to mesh with said ring gear on said hand wheel, said shaft having two spaced annular concave grooves therein adjacent the center of said counter and an outwardly facing bevel gear mounted thereon immediately adjacent the outer wall of said open portion, a locking pin contained within said radial base hole having a convex inner end adapted to selectively engage the inner annular shaft groove to retain said pinion gear in mesh with said ring gear and said outer annular shaft groove on axial movement of said shaft by said manipulating knob to retain said pinion gear out of mesh with said ring gear, a plug for the outer end of said radial hole and expansion spring means in said hole located between said locking pin and plug adapted to yield for axial movement of said shaft, a pointer shaft having a rear end resting in said base bearing hole extending forwardly, a cooperating downwardly facing bevel gear rigidly mounted on said pointer shaft adapted to mesh with said operating shaft bevel gear in its outermost position, means supporting said pointer shaft in a substantially axial position, a transparent dial cap for the front end of said shell, a calibrated dial mounted on said shell and a pointer mounted on the front end of said pointer shaft between said transparent cover and the dial.

13. An attachment for a machine for removing stock from work having a hand wheel for adjusting the relative positions of the work and the stock removing tool, comprising a ring gear removably mountable on the inner surface of said hand wheel, and a counter mounted on said machine and comprising a hollow shell having an outer shaft hole in the side wall thereof, means to rigidly mount said counter on said machine with said shaft hole substantially normal to the teeth of said ring gear, a solid base extending upwardly a distance within said shell, having a pointer shaft bearing hole centrally of the front wall thereof, an open inner portion beyond the center line thereof extending from the outer surface of said open portion to the outer edge of said shell aligned with said shell hole, an operating shaft extending through said shell and base holes having a pinion gear on its outer end adapted to mesh with said ring gear on said hand wheel, said shaft having an outwardly facing bevel gear mounted thereon immediately adjacent the outer wall of said open portion, a disc floor mounted on said shell at a spaced distance from said base front surface, having a pointer shaft hole centrally thereof and an open portion at the inner end thereof, a pointer shaft having a rear end resting in said base bearing hole extending forwardly through said floor hole and having a reduced portion projecting forwardly beyond said shell and forming a shoulder, a cooperating downwardly facing bevel gear rigidly mounted on said pointer shaft between said base front surface and floor adapted to mesh with said operating shaft bevel gear, a bow spring having a pointer shaft receiving hole centrally of the rearwardly extending bow thereof with its bow abutting the shoulder on the pointer shaft and its ends abutting the rear surface of said floor, means to rigidly secure said floor at a spaced distance from said base front surface, a transparent dial cap for the front end of said shell, a calibrated dial disc mounted on said shell and a pointer mounted on the front end of said pointer shaft between said transparent cover and the dial.

14. An attachment for a machine for removing stock from work having a hand wheel for adjusting the relative positions of the work and the stock removing tool, comprising a ring gear removably mountable on the inner surface of said hand wheel, and a counter mounted on said machine and comprising a hollow shell having an outer shaft hole in the side wall thereof, means to rigidly mount said counter on said machine with said shaft hole substantially normal to the teeth of said ring gear, a solid base extending upwardly a distance within said shell, having a pointer shaft bearing hole centrally of the front wall thereof and having an open inner portion beyond the center line thereof extending to adjacent the rear end thereof, an operating shaft hole extending from the outer surface of said open portion to the outer edge of said shell aligned with said shell hole, an operating shaft extending through said shell and base holes having a pinion gear on its outer end adapted to mesh with said ring gear on said hand wheel, said shaft having an outwardly facing bevel gear mounted thereon immediately adjacent the outer wall of said open portion, a disc floor mounted on said shell at a spaced distance from said base front surface having a pointer shaft hole centrally thereof and an open portion at the inner end thereof, a pointer shaft having a rear end resting in said base bearing hole extending forwardly through said floor hole and having a reduced portion projecting forwardly beyond said shell and forming a shoulder, a cooperating downwardly facing bevel gear rigidly mounted on said pointer shaft between said base front surface and floor adapted to mesh with said operating shaft bevel gear, a transparent rotatable dial cap for the front end of said shell, comprising a flat front rim plate adapted to overlie the front edge of said shell, having an annular cover receiving bezel in its front edge and a dial receiving groove in its rear edge, having a notch therein and having a rearwardly extending cylindrical rim having means extending radially within said shell groove to rotatably retain said cap on said shell, a concave lens shape transparent cover mounted within said internal cap bezel, a calibrated dial disc abutting the dial groove of said rotatable cap, having a projection fitting into said notch so that said dial will rotate with the cap, a coil spring having its rear end abutting said floor and its front end abutting said dial to retain said dial in position within said cap groove and permit rotation thereof therewith, and a pointer mounted on the front end of said pointer shaft between said transparent cover and the dial.

15. An attachment for a machine for removing stock from work having a hand wheel for adjusting the relative positions of the work and the stock removing tool, comprising a ring gear removably mountable on the inner surface of said hand wheel, and a counter mounted on said machine and comprising a hollow shell having an outer shaft hole in the side wall thereof, means to rigidly mount said dial on said machine with said shaft hole substantially normal to the teeth of said ring gear, a solid base extending upwardly a distance within said shell, having a pointer shaft bearing hole centrally of the front wall thereof and having an open inner portion beyond the center line thereof extending to adjacent the rear end thereof, an operating shaft hole extending from the outer surface of said open portion to the outer edge of said shell aligned with said shell hole, an operating shaft extending through said shell and base holes having a pinion gear on its outer end adapted to mesh with said internal gear on said hand wheel, said shaft having an outwardly facing bevel gear mounted thereon immediately adjacent the outer wall of said open portion, a disc floor mounted on said shell at a spaced distance from said base front surface having a pointer shaft hole centrally thereof and an open portion at the inner end thereof, a pointer shaft having a rear end resting in said base bearing hole extending forwardly through said floor hole and having a reduced portion projecting forwardly beyond said shell and forming a shoulder, a cooperating downwardly facing bevel gear rigidly mounted on said pointer shaft between said base front surface and floor adapted to mesh with said operating shaft bevel gear in its outermost position, a transparent rotatable dial cap for the front end of said shell, comprising a flat front rim plate adapted to overlie the front edge of said shell, having an annular cover receiving bezel in its front edge and a dial receiving groove in its rear edge having a rearwardly extending cylindrical rim having means extending radially within said shell groove to rotatably retain said cap on said shell, a concave lens shape transparent cover mounted within said internal cap bezel, a calibrated dial disc abutting the dial groove of said rotatable cap, a coil spring having its rear end abutting said floor and its front end abutting said dial to retain said dial in position within said cap groove and permit rotation thereof therewith, and a pointer mounted on the front end of said pointer shaft between said transparent cover and the dial.

CECIL WALTER WHITING.

REFERENCES CITED

The following references are of record in the file of this patent:

UNITED STATES PATENTS

| Number | Name | Date |
|---|---|---|
| 1,235,437 | Chard | July 31, 1917 |
| 2,127,877 | Maglott | Aug. 23, 1938 |
| 2,153,424 | MacRae | Apr. 4, 1939 |

OTHER REFERENCES

Ser. No. 420,313, Fouquet (A. P. C.), published June 15, 1943.